3,829,470
ALKYLPHENOL DISULFONATION PROCESS
Eric D. Hannah, Mill Valley, Calif., assignor to Chevron Research Company, San Francisco, Calif.
No Drawing. Filed Jan. 13, 1972, Ser. No. 217,630
Int. Cl. C07c 143/42
U.S. Cl. 260—512 R          4 Claims

ABSTRACT OF THE DISCLOSURE

Two-step process for production of alkylphenol polysulfonic acids in which the alkylphenol is reacted with oleum in an initial sulfonation step at a temperature of 50 to 80° C. and digested at a lower temperature in the range of 0 to 50° C. to complete the incorporation of 1.5 to 2.0 sulfonic acid groups.

BACKGROUND OF THE INVENTION

Field of the Invention

Higher alkylphenol disulfonic acids are useful as surface active materials and the salts formed by neutralizing these acids with water-soluble, salt-forming cations are useful as surface active compounds in heavy duty detergent formulations which function effectively in the absence of phosphate builders.

The disulfonic acids are produced by sulfonating a suitable alkylphenol with a sulfonating agent such as sulfuric acid or oleum (fuming sulfuric acid). In order to effect rapid disulfonation it has been found to be preferable to use oleum as the sulfonating agent. Most usually the amount and strength of the oleum is adjusted so that the bulk of the sulfonation occurs rapidly with the free sulfur trioxide content of the oleum. Use of oleum of too high strength, however, will result in discoloration of the salts derived from the acid. It is therefore preferred that after the initial but incomplete sulfonation, which is effected by the free sulfur trioxide content of the oleum, the final sulfonation be effected by the remaining sulfuric acid during a digestion period. This is usually accomplished in a digestion zone or vessel with the mixture simply being agitated for a period of time sufficient to raise the average sulfonic acid group content to a desired level, usually between about 1.5 and 2.0 groups per molecule, preferably 1.8 to 2.0 groups per molecule.

In conventional aryl sulfonation as of alkylbenzene to produce alkylbenzene sulfonate detergents, it is common practice to add sufficient oleum to partially sulfonate the alkylbenzene with the sulfur trioxide content. The final sulfonation is then accomplished during a digestion period during which the temperature of the mixture is raised above the original reaction temperature. At the end of the digestion period the sulfonic acid content of the product will approach one unit per molecule.

When this method is employed with the alkylphenols, the product darkens and is unsuitable after neutralization for use as a detergent.

Description of the Prior Art

U.S. Pat. 2,249,757 describes the production of alkylphenol sulfonates by reaction of alkylphenols with sulfuric acid, oleum or chlorosulfonic acid. No effort was made to polysulfonate the alkylphenol, although there is an implicit statement that some polysulfonated material was produced.

SUMMARY OF THE INVENTION

A process is provided for the production of alkylphenol polysulfonic acids which when neutralized provide polysulfonates which are materials of good color suitable for incorporation as detergent actives in phosphate-free detergent formulations. The polysulfonic acids are produced by adding oleum to an alkylphenol in which the alkyl groups contain from about 16 to 24 carbon atoms. The oleum will usually have a strength of about 15 to 30%. The addition of the oleum to the alkylphenol is effected over a period of from 5 to 30 minutes, from about 5 to 8 mols of oleum being employed per mol of alkylphenol. The temperature during the addition is maintained in the range from about 50 to 80° C., preferably from 50 to 65° C. At the end of the oleum addition the partially polysulfonated material is digested in the absence of oxygen for a time sufficient to complete sulfonation; i.e. incorporate an average of about 1.5 to 2.0 sulfonic acid groups per molecule. The temperature of the material during the digestion period is maintained at a temperature lower than during oleum addition, usually in the range of from about 0 to 50° C., preferably from about 10 to 40° C.

The oleum-to-alkylphenol ratio is chosen so as to effect a large portion of the sulfonation during the addition step. However, if the strength of the oleum is too high and the temperature during the addition step is maintained at a high level for a long period, the color development will make the material unsuitable for detergent use. Therefore, the technique applied to large-scale commercial monosulfonation of alkylbenzene, for example, will not be applicable in the case of the alkylphenols. In the commercial alkylbenzene sulfonation processes oleum is added and the material is then digested at a higher temperature than the addition temperature in order to complete sulfonation. The more sensitive nature of the alkylphenols and their susceptibility to color development makes this process unsuitable.

The amount of oleum to be employed is determined from the strength of the oleum and the desired ratio of oleum to alkylphenol. Thus the number of mols of oleum is derived from the total mols of sulfur in the oleum. The expression of oleum strength by percent is based upon the parts of $SO_3$ in the $SO_3$—$H_2SO_4$ mixture.

Thus, for example, the mols of oleum in 100 g. of 15% oleum are calculated as follows:

15 g. $SO_3$ ÷ 80 (MW $SO_3$) = 0.1875 mols
85 g. $H_2SO_4$ ÷ 98 (MW $H_2SO_4$) = 0.8680 mols
                                      1.0555 mols Normally, sufficient oleum of desired strength is employed in the initial sulfonation step to provide from about 0.9 to 1.5, preferably about 1.2, mols of $SO_3$ per mol of alkylphenol. The remaining sulfonic acid groups will be provided by the sulfuric acid remaining.

The alkylphenols which may be usefullly sulfonated by the process of this invention include those prepared by conventional techniques such as thermal and catalytic alkylation of phenol with olefins, alcohols, and haloparaffins. Catalytic methods include the use of catalysts such as aluminum, aluminum chloride, zinc chloride, etc., and various other acid catalysts and clay catalysts.

The alkyl groups of the alkylphenols are usually substantially linear in character because of the desirable biodegradability of the detergent materials which are produced, although the process is applicable to branched chain materials.

Sulfonation of the alkylphenols is, as previously mentioned, accomplished in two steps, and this may be done in one vessel or in two vessels in a continuous process. It is advantageous during the olefin addition to maintain extremely good stirring at the point of initial contact between the oleum and the alkylphenol. Addition may thus be accomplished by adding the oleum to the alkylphenol in a stirred vessel or, most conveniently, in a continuous process in a circulating loop. The phenol-oleum reaction product is then removed and cooled to a temperature of from about 0 to 40° C., preferably 0 to 30° C. Alternatively, cooling may be done in the same vessel. The digestion time at reduced temperature will be for a time sufficient to complete the polysulfonation and most usually will be a time within the range of one-half to five hours, preferably one to three hours.

The following example illustrates the effectiveness of the process of this invention.

EXAMPLE

An alkylphenol in which the alkyl groups contain an average of 17 to 20 carbon atoms was sulfonated with 5.5 mols of 20% oleum at a temperature of about 50° C. in a pump loop reactor with an average residence time of 12 minutes. The product, which had an average of 1.6 sulfonic acid groups per molecule, was divided into three portions and placed in three separate vessels, the temperature of each being maintained at 25°, 50° and 70° C. for times sufficient for the products to reach an average of 1.9 sulfonic groups per molecule. At the end of the digestion period each material was diluted to a 5% concentration in water and the color of the solution was measured in a Klett colorometer. The data from these tests are set forth in the following table.

TABLE
[Digestion of a sulfonation product]

| Fraction No. | Temperature, ° C. | Time, hr.[1] | Color, Klett[2] |
|---|---|---|---|
| 1 | 25 | 2.5 | 192 |
| 2 | 50 | 1.8 | 270 |
| 3 | 70 | 0.5 | 550 |

[1] Time to reach an average of 1.9 sulfonic acid groups incorporated per molecule.
[2] Color measured on a 5% solution in a 40 mm. cell.

It may be seen from these data that the color obtained at the lower digestion temperature (25° C.) is significantly less than that obtained at the sulfonation temperature (50° C.) and at a temperature greater than sulfonation temperature (70° C.).

While the character of this invention has been described in detail, this has been done by way of illustration only and without limitation of the invention. It will be apparent to those skilled in the art that modifications and variations of the illustrative examples may be made in the practice of the invention within the scope of the following claims.

I claim:
1. A process for the production of alkylphenol polysulfonic acids comprising the steps of
   (A) adding with agitation sufficient to ensure contact of the reactants, from 5 to 8 mols of oleum having a strength of from about 15% to 30% to one mol of monoalkylphenol in which the alkyl group contains from about 16 to 24 carbon atoms, the addition of the oleum being effected at a relatively uniform rate over a period of from about 5 to 60 minutes, the temperature of the mixture during the addition being maintained in the range of about 50° to 80° C., and
   (B) digesting the mixture of (A) in the absence of oxygen for a time sufficient to incorporate an average of 1.5 to 2.0 sulfonic acid groups per molecule of alkylphenol, while maintaining the temperature of the mixture in the range of about 0° to 50° C. and below the temperature maintained in step (A).

2. The process of Claim 1 wherein the temperature of the reaction in step (A) is 50° to 65° C.

3. The process of Claim 1 in which the digestion temperature in step (B) is 10° to 40° C.

4. The process of Claim 1 wherein the time of duration for step (B) is from about ½ to about 5 hours.

References Cited

UNITED STATES PATENTS 2,205,948   6/1940   Flett _____ 260—512 R
2,249,757   7/1941   Flett _____ 260—512 R LEON ZITVER, Primary Examiner
N. CHAN, Assistant Examiner